UNITED STATES PATENT OFFICE.

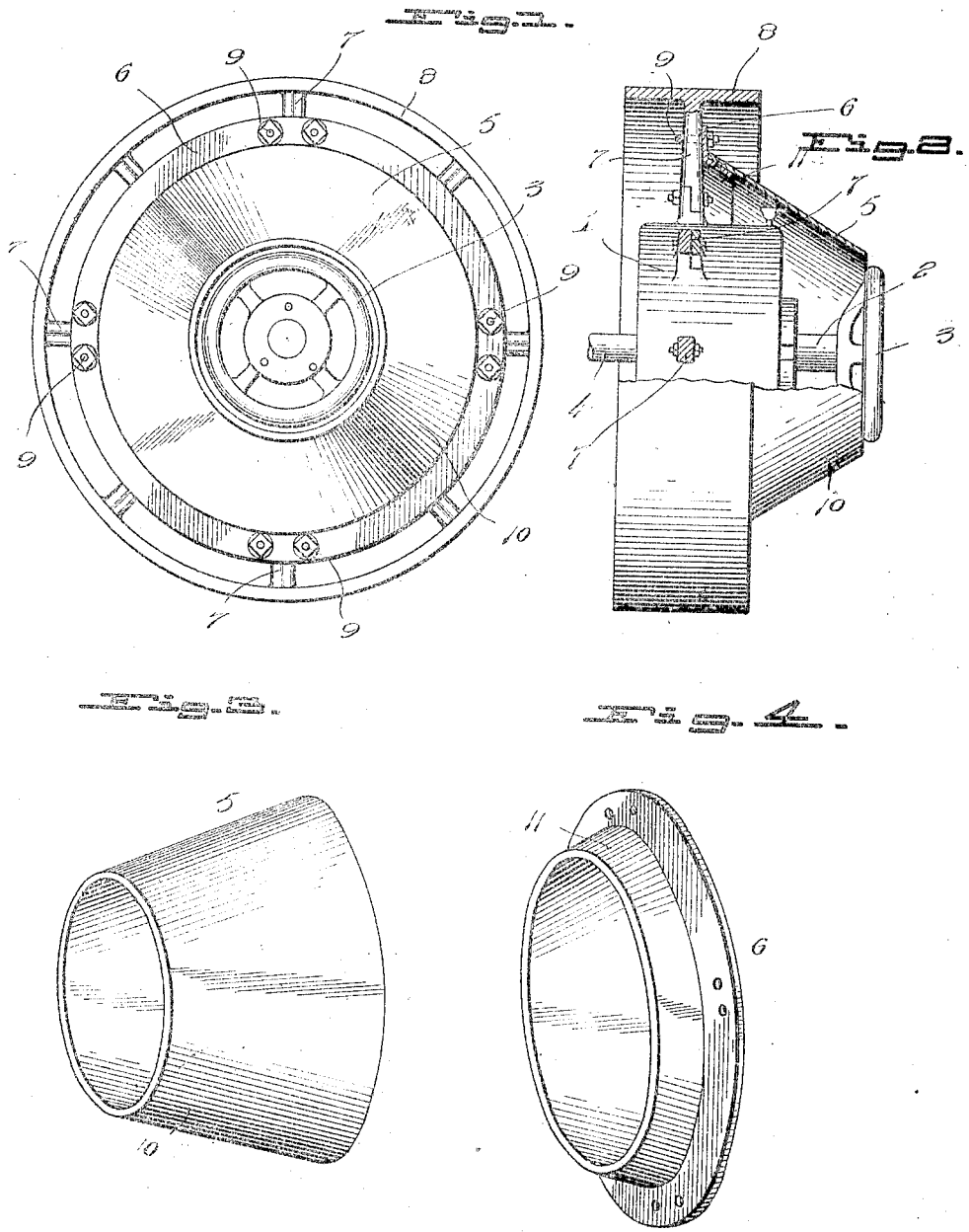

WILLIAM SCHOEPKE, OF HARTLAND, ILLINOIS.

SAFETY DEVICE FOR PULLEYS.

1,087,836. Specification of Letters Patent. Patented Feb. 17, 1914.

Application filed January 3, 1913. Serial No. 740,016.

*To all whom it may concern:*

Be it known that I, WILLIAM SCHOEPKE, a citizen of the United States, residing at Hartland, in the county of McHenry and State of Illinois, have invented new and useful Improvements in Safety Devices for Pulleys, of which the following is a specification.

This invention relates to a safety device for pulleys, and has for an object to provide a protective guard which is adapted to be applied to pulleys, and in particular to friction clutch pulleys, for deflecting the belt from the pulley, when it has become disengaged from the same, so as to prevent its becoming entangled within the friction clutch mechanism.

In the use of friction clutch pulleys, when the belt slips off the pulley for any reason, it invariably becomes engaged with the operating hand wheel or other parts of the clutch mechanism, thus causing considerable damage to the machinery with which the pulley is used, and at the same time endangering the lives of the attendants.

A further object of the invention is the provision of a safety device of this character which is adapted to be attached readily to any pulley, and which may be readily detached therefrom whenever desired.

A still further object is to provide a safety device of simple construction and few parts, which may be cheaply manufactured and will be very durable and efficient in use.

The invention consists in the features of construction, combination and arrangement of parts, hereinafter fully described and claimed, reference being had to the accompanying drawings, in which:

Figure 1 is a side elevation of the device in use upon a friction clutch pulley; Fig. 2 is a fragmentary front elevation of the same; Fig. 3 is a detail perspective view of the guard member; and, Fig. 4 is a similar view of the attaching member.

In the drawing, 1 designates a pulley, which in this particular instance is of the friction clutch type, and which is adapted to be used in connection with an engine, or other prime mover. This pulley is necessarily provided with an operating shaft 2 and hand wheel 3 upon one side thereof, as means by which the friction clutch mechanism of the said pulley may be adjusted to connect the pulley rigidly to the shaft 4 upon which it is mounted, or to render its connection therewith loose.

My safety device or protective guard 5 includes an annular attaching member 6 which is adapted to be secured to the spokes 7 of the pulley 1 within its rim 8 by means of the U-bolts 9, and an outwardly-tapered, frusto-conical shell or guard member 10, which latter is riveted or secured in any other suitable manner to the exteriorly projecting beveled flange 11 provided upon the attaching member 6. The guard member 10 of the safety device is adapted to project outwardly to such a distance that, should the belt slip off the rim of the pulley outwardly therefrom, it will become engaged with the said guard member and will be deflected outwardly from the pulley without becoming engaged with any part of the clutch operating mechanism. The outer end of the guard member 10 is slightly larger in diameter than the hand wheel 3, so as to afford sufficient space for the insertion of the attendant's fingers in the act of grasping the said hand wheel to effect operation of the clutch mechanism.

It is to be understood that the above described safety device is to be constructed of very durable material, preferably cast steel, so that it will be very durable and will withstand the strain of the belt upon its becoming engaged with the same, so that the said belt will be properly deflected from the pulley. When the guard member becomes excessively worn it may be detached from the attaching member and a new guard member substituted therefor.

From the foregoing description, it will be evident that I have provided an efficient safety device or protective guard for application to any form of pulley, but which is especially applicable to friction clutch pulleys, in the use of which there is most danger incident with the detachment of the belt from the pulley rim.

What is claimed is:

1. In a device of the class described, the combination with a shaft and a pulley mounted terminally thereon, of a guard member therefor comprising an annular attaching member, means for securing the said member to the pulley inward of its rim, an outwardly projecting flange formed upon said attaching member, and a hollow, frusto-conical body having both ends open, the large end of the body being secured to the flange of the attaching member.

2. In a device of the class described, the combination with a shaft and a pulley mounted terminally upon said shaft, of a guard therefor comprising an annular attaching member adapted to be mounted against the spokes of the pulley inward of its rim, the said member being provided with a plurality of circumferentially spaced pairs of openings, a plurality of U-shaped attaching bolts adapted for engagement with the pulley spokes, each bolt being adapted to have its free ends engaged within the openings of one of the pairs in the said attaching member, and a hollow frusto-conical guard member having both of its ends open, the larger end of the guard member being connected with the attaching member to project axially therefrom.

In testimony whereof I affix my signature in presence of two witnesses.

WILLIAM SCHOEPKE.

Witnesses:
PETER KATZ,
FRANK KATZ.